United States Patent Office 3,401,207
Patented Sept. 10, 1968

3,401,207
PROCESS FOR MAKING POLYNUCLEAR
AROMATIC COMPOUNDS
Charles M. Selwitz, Pitcairn, Pa., assignor to Gulf Research & Development Company, Pittsburgh, Pa., a corporation of Delaware
No Drawing. Filed Dec. 19, 1966, Ser. No. 602,470
19 Claims. (Cl. 260—670)

This invention relates to a process for producing polynuclear aromatic compounds whose aromatic nuclei are directly linked to one another by nuclear carbon to nuclear carbon bond, particularly to a process for converting benzene or substituted benzenes to diphenyl or substituted diphenyls, respectively.

Briefly, the present process comprses treating an aromatic compound with itself or with another aromatic in a halide-free and a nitrate-free system in the presence of a strong acid catalyst and a noble metal salt of an organic acid, particularly a palladium salt of a carboxylic acid, under selected conditions and for a time sufficient to obtain the desired polynuclear aromatic compound.

Any aromatic compound containing one or more aromatic rings, or a mixture of such compounds, having a labile hydrogen attached to at least one carbon atom in the aromatic nucleus, can be employed herein. By "labile" I mean that the hydrogen possesses an electronic and steric environment which permits its removal from the nucleus. Examples of such aromatic compounds that can be employed are aromatic compounds having from six to 74 carbon atoms, preferably from six to 24 carbon atoms, such as benzene, toluene, chlorobenzene, methylbenzoate, naphthalene, phenyl acetate, anisole, ortho xylene, cumene, α,α-dimethylbenzylsuccinic anhydride, diphenyl, etc. These compounds when employed herein will form, for example, the following polynuclear aromatic compounds: biphenyl, bitolyl, p,p'-dichlorobiphenyl, dimethyl biphenyldicarboxylate, binaphthyls, dihydroxybiphenyl diacetate, dimethoxybiphenyl, 3,3', 4, 4'-dimethylbiphenyl, diisopropylbiphenyl, p,p'-di(1,1 - dimethylpropyl-2,3-dicarboxylic acid anhydride)biphenyl, tetraphenyl, etc. Although the main product herein will be a dimer of the aromatic charge, lesser amounts of trimers and higher polymers will also be formed.

The metallic portion of the noble metal salts employed herein include palladium, rhodium, iridium, osmium, ruthenium, and platinum. Palladium is the preferred metal. The anionic portion of the noble metal salt can be derived from organic acids, particularly carboxylic aids, having from one to 40 carbon atoms, preferably from two to 10 carbon atoms, such as formic, acetic, propionic, butyric, pivalic, octanoic, isooctanoic, benzoic, lauric, stearic, isobutyric, para-toluic, gamma-chlorobutyric, tetracontanoic, phenylacetic, cyclohexane carboxylic, crotonic furoic, heptanoic, eicosanoic, etc. The preferred carboxylic acid is acetic acid. Examples of such salts that can be employed herein include rhodium formate, palladium acetate, palladium propionate, iridium butyrate, palladium pivalate, palladium octanoate, osmium isooctanoate, palladium benzoate, palladium laurate, ruthenium stearate, palladium isobutyrate, palladium para-toluate, platinum gammachloro butyrate, ruthenium tetracontanoate, osmium phenylacetate, iridium cyclohexane carboxylate, rhodium crotonate, palladium furoate, palladium heptanoate, palladium eicosanoate, etc. The preferred salt is palladium acetate.

The catalyst employed in the present reaction is a strong acid, that is, one having an ionization constant, K at 25° C. of $10^{-3}$ or higher. Specific examples of acids that can thus be employed as catalysts include sulfuric, perchoric, phosphoric, trifluoroacetic, glycerophosphoric, iodic, periodic, pyrophosphoric, trichloroacetic, etc.

Preferably the reaction of the present process is carried out in a suitable liquid medium, for example, inert, highly polar compounds. Particularly suitable are carboxylic acids having from one to eight carbon atoms, preferably from two to four carbon atoms. Examples of such carboxylic acids that can be employed include formic, acetic, propionic, butyric, isobutyric, valeric, hexanoic, heptanoic, gamma chlorobutyric, octanoic, methoxyacetic, etc. Acetic acid is preferred. Other liquids that can be employed include ethers, amides, sulfoxides, ketones, such as meta dioxane, dimethylacetamide, dimethylformamide, dimethylsulfoxide, acetone, etc.

Although I do not intend to be limited thereby, I believe the reaction defined herein proceeds as follows, using benzene and palladium acetate as representative of the reactants and perchloric acid as the catalyst.

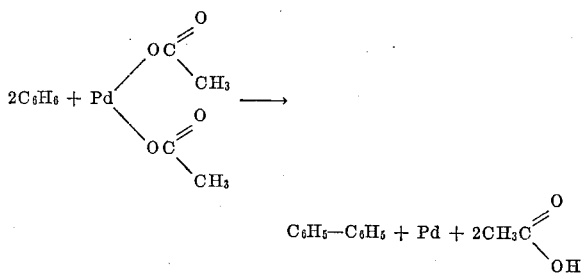

$$C_6H_5-C_6H_5 + Pd + 2CH_3C\underset{OH}{\overset{O}{\diagup\!\!\!\diagdown}}$$

The amounts of reactants and catalysts employed can vary over wide limits. Thus, although two mols of the aromatic compound are required per mol of palladium salt, if desired from about 0.1 to about 100 mols of aromatic, preferably from about one to about five mols of aromatic per mol of palladium salt can be employed. The amount of catalyst employed can be as little as about 0.01 mol per mol of noble metal salt, but perferably is within the range of about 0.1 to about 10 mols per mol of noble metal salt. Temperatures employed in the reaction can be, for example, from about 60° to about 200° C., preferably in the range of about 80° to about 140° C., and the pressure can be, for example, from about 0.1 to about 1000 pounds per square inch gauge, preferably within the range of about 10 to about 100 pounds per square inch gauge. Reaction time can also vary over a wide range, for example, from about 0.001 to about 100, preferably from about 0.1 to about 10 hours.

A particularly attractive feature of the present process results in the fact that the same can be carried out to obtain a polynuclear aromatic compound with the consumption only of the aromatic charge. This can be illustrated using benzene and palladium acetate as reactants, perchloric acid as catalyst and acetic acid as the inert reaction medium. As illustrated above, two mols of benzene will react with one mol of palladium acetate to produce one mol of diphenyl, one mol of palladium metal and two mols of acetic acid. The reaction mixture will additionally contain the perchloric acid catalyst. Water can then be added to the reaction mixture. At the bottom of the resultant product there will be metallic palladium, above it a layer containing acetic acid, water and the catalyst and on top of it the diphenyl and unreacted benzene. The two liquid layers can be removed therefrom and separated from each other by any suitable means, for example, by decantation. The biphenyl can be removed from excess, unreacted benzene by any suitable means, for example, by distillation. The water can be removed from the aqueous layer in any suitable manner, for example, by distillation, leaving behind acetic acid and catalyst. The palladium metal can then be reoxidized in the presence of the acetic acid so recovered, with or without the presence of the perchloric acid, in any suitable manner, for example, by heating with oxygen at elevated pressure and temperature, to reoxidize the same to palladium acetate. The process of converting fresh benzene to diphenyl in the presence of the regenerated palladium acetate and perchloric acid can then be carried out as described.

It is imperative, however, that the reaction defined herein be carried out in a system free of the presence of a halide ion or a nitrate ion. By "halide ion" I mean to include chloride, bromide, iodide or fluoride ion, and by "nitrate" I mean to include the nitrate ion, $NO_3$, or any nitrogen containing species readily convertible to $NO_3$. The presence of a halogen or nitrate ion in the system appears to inhibit the desired polynuclear aromatic formation. Thus, palladium dichloride, nitric acid, nitrous acid, platinum bromide, ruthenium fluoride, osmium iodide, sodium nitrate, potassium nitrite, etc. in the system appear to be detrimental to the course of the desired reaction.

The process defined herein can further be illustrated by the following.

Example I

Into a 125 milliliter flask there was placed an aromatic compound, a strong acid catalyst, a palladium salt and 100 milliliters of acetic acid. The mixture was refluxed (110° C.) at atmospheric pressure, and then identified by gas phase chromatography. The data obtained are set forth below in Table I. Note that wherein the conditions of the present process were followed a dimer and a trimer of the aromatic charge can be produced. In Runs Nos. 3 and 4 wherein palladium chloride was employed, thus introducing a halogen ion in the system, no dimer or trimer of benzene was obtained.

pound with a noble metal salt of an organic acid in the presence of a strong acid in a reaction system free of halide ions and nitrate ions.

2. The process of claim 1 wherein said latter aromatic compound is benzene.

3. The process of claim 1 wherein said latter aromatic compound is toluene.

4. The process of claim 1 wherein said noble metal salt is a palladium salt of an organic acid.

5. The process of claim 1 wherein said noble metal salt is a palladium salt of a carboxylic acid.

6. The process of claim 1 wherein said noble metal is palladium acetate.

7. The process of claim 1 wherein the strong acid is perchloric acid.

8. The process of claim 1 wherein the strong acid is sulfuric acid.

9. The process of claim 1 wherein the strong acid is trifluoroacetic acid.

10. The process of claim 1 wherein the reaction is carried out in an inert liquid medium.

11. The process of claim 1 wherein the reaction is carried out in acetic acid.

12. The process of claim 1 wherein said latter aromatic compound is benzene, the noble metal salt is palladium acetate and the catalyst is perchloric acid.

13. The process of claim 1 wherein said latter aromatic compound is benzene, the noble metal salt is palladium acetate and the catalyst is sulfuric acid.

14. The process of claim 1 wherein said latter aromatic compound is benzene, the noble metal salt is palladium acetate and the catalyst is phosphoric acid.

15. The process of claim 1 wherein said latter aromatic

TABLE I

| Run No. | Aromatic compound | Grams of aromatic compound | Palladium salt | Mols of palladium salt | Acid catalyst | Mols of catalyst | Reflux time, hours | Percent yield based on palladium | |
|---|---|---|---|---|---|---|---|---|---|
| | | | | | | | | Biphenyl | Terphenyl |
| 1 | Benzene | 6.7 | Palladium acetate | 0.005 | Perchloric | 0.01 | 24 | 81 | 13 |
| 2 | do | 6.7 | do | 0.005 | Sulfuric | 0.01 | 24 | 58 | 12 |
| 3 | do | 6.7 | Palladium chloride | 0.005 | Perchloric | 0.01 | 24 | 0 | 0 |
| 4 | do | 6.7 | do | 0.005 | do | 0.01 | 124 | 0 | 0 |
| 5 | do | 6.7 | Palladium acetate | 0.005 | Phosphoric | 0.01 | 24 | 25 | 4 |
| 6 | do | 6.7 | Palladium cyanide | 0.0025 | Sulfuric | 0.005 | 24 | 54 | |
| 7 | do | 6.7 | Palladium acetate | 0.005 | Trifluoroacetic | 0.01 | 24 | 27 | |
| 8 | Toluene | 10.0 | do | 0.005 | Perchloric | 0.01 | 24 | [1] 80 | |

[1] Bitolyl.

Example II

That the presence of the nitrate ion is detrimental in the reaction system herein is illustrated by the following. A mixture of 20 millimols of benzene, five millimols of palladium acetate and 10 millimols of 6 N nitric acid in 25 milliliters of acetic acid was refluxed at 110° C. and atmospheric pressure for 20 hours. The product was found to contain 48 percent by weight of phenyl acetate, 17 percent by weight of phenol and only four percent by weight of biphenyl.

Obviously, many modifications and variations of the invention, as hereinabove set forth, can be made without departing from the spirit and scope thereof, and therefore only such limitations should be imposed as are indicated in the appended claims.

I claim:

1. A process for the production of a polynuclear aromatic compound from an aromatic compound having a labile hydrogen atom attached to the nucleus thereof which comprises contacting said latter aromatic comcompound is benzene, the noble metal catalyst is palladium cyanide and the catalyst is sulfuric acid.

16. The process of claim 1 wherein said latter aromatic compound is benzene, the noble metal catalyst is palladium acetate and the catalyst is trifluoroacetic acid.

17. The process of claim 1 wherein said latter aromatic compound is toluene, the noble metal catalyst is palladium acetate and the catalyst is perchloric acid.

18. The process of claim 1 wherein the reaction is carried out in an inert liquid medium corresponding to the anionic portion of said noble metal salt.

19. The process of claim 1 wherein the noble metal salt is palladium acetate and the reaction is carried out in the acetic acid.

References Cited

UNITED STATES PATENTS 3,145,237  8/1964  Van Helden et al. ____ 260—670

DELBERT E. GANTZ, *Primary Examiner.*

C. R. DAVIS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,207             September 10, 1968

Charles M. Selwitz

It is certified that error appears in the above identified patent and that said Letters Patent are hereby corrected as shown below:

Column 1, line 55, "crotonic" should read -- crotonic, --
Column 3, lines 12 and 13, $NO_3$        should read        $NO_3^-$ Signed and sealed this 10th day of February 1970.

(SEAL)
Attest:

Edward M. Fletcher, Jr.        WILLIAM E. SCHUYLER, JR
Attesting Officer             Commissioner of Patents